US012542765B2

United States Patent
Shwartz et al.

(10) Patent No.: US 12,542,765 B2
(45) Date of Patent: Feb. 3, 2026

(54) REMOTE SERVER ISOLATION UTILIZING ZERO TRUST ARCHITECTURE

(71) Applicant: HEWLETT PACKARD ENTERPRISE DEVELOPMENT LP, Spring, TX (US)

(72) Inventors: Shay Shwartz, Tel Aviv (IL); Gil Azrielant, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 205 days.

(21) Appl. No.: 18/359,538

(22) Filed: Jul. 26, 2023

(65) Prior Publication Data

US 2025/0039152 A1    Jan. 30, 2025

(51) Int. Cl.
 H04L 9/40 (2022.01)
(52) U.S. Cl.
 CPC ........ H04L 63/029 (2013.01); H04L 63/0227 (2013.01); H04L 63/08 (2013.01)
(58) Field of Classification Search
 CPC ... H04L 63/029; H04L 63/0227; H04L 63/08; H04L 63/0272
 See application file for complete search history.

(56) References Cited

U.S. PATENT DOCUMENTS

| | | | |
|---|---|---|---|
| 10,764,263 B2 * | 9/2020 | Rossi | H04L 9/3268 |
| 11,240,242 B1 * | 2/2022 | Celik | H04L 12/4633 |
| 11,470,100 B1 * | 10/2022 | Christian | H04L 63/102 |
| 12,155,667 B2 | 11/2024 | Sviry et al. | |
| 2012/0265976 A1 * | 10/2012 | Spiers | G06F 21/57 713/2 |
| 2016/0087933 A1 * | 3/2016 | Johnson | H04W 12/35 709/245 |
| 2016/0234196 A1 * | 8/2016 | Fausak | H04L 67/08 |
| 2017/0064005 A1 * | 3/2017 | Lee | H04L 67/141 |
| 2018/0152426 A1 * | 5/2018 | Rossi | H04L 63/0823 |
| 2018/0255060 A1 * | 9/2018 | Bansal | H04L 67/51 |
| 2019/0141015 A1 * | 5/2019 | Nellen | H04L 63/0272 |
| 2020/0236112 A1 * | 7/2020 | Pularikkal | H04L 63/1425 |
| 2020/0336466 A1 * | 10/2020 | Goldschlag | H04L 61/4511 |
| 2021/0218747 A1 | 7/2021 | Azrielant et al. | |
| 2021/0240818 A1 * | 8/2021 | Seksenov | G06F 16/986 |

(Continued)

OTHER PUBLICATIONS

Rose, Scott, et al. "Sp 800-207: Zero trust architecture." National Institute of Standards and Technology (NIST), Computer Security Resource Center 8 (2020).*

(Continued)

*Primary Examiner* — Jimmy H Tran
(74) *Attorney, Agent, or Firm* — Hewlett Packard Enterprise Patent Department

(57) ABSTRACT

A zero trust cloud environment provides access to a secure network, and secure network applications. The zero trust cloud environment performs authentication of a user account, and upon successful completion initiates a secure network application, such as an SSH session to a server in a secure network. The server is instructed to generate an isolated network namespace through which a virtual network interface is bridged to the default network namespace. A firewall of the default network namespace does not permit network traffic from the virtual network interface to pass if it is directed to an address of the secure network.

19 Claims, 5 Drawing Sheets

(56) References Cited

U.S. PATENT DOCUMENTS

| | | | | |
|---|---|---|---|---|
| 2022/0038281 | A1* | 2/2022 | King | H04L 63/0263 |
| 2022/0075889 | A1* | 3/2022 | Friedman | G06F 21/6218 |
| 2022/0294788 | A1* | 9/2022 | Pattar | H04L 63/10 |
| 2022/0353201 | A1* | 11/2022 | Navali | H04L 41/5054 |
| 2023/0104568 | A1* | 4/2023 | Miriyala | H04L 45/42 |
| | | | | 718/104 |
| 2023/0106531 | A1* | 4/2023 | Henkel | G06F 9/5072 |
| | | | | 709/223 |
| 2023/0107891 | A1* | 4/2023 | Miriyala | G06F 9/45558 |
| | | | | 370/254 |
| 2023/0123781 | A1* | 4/2023 | Kaimal | H04L 41/0893 |
| | | | | 726/12 |
| 2023/0224167 | A1* | 7/2023 | Wang | H04L 63/10 |
| | | | | 713/158 |
| 2023/0224302 | A1* | 7/2023 | Sviri | H04L 63/168 |
| | | | | 726/5 |
| 2023/0224303 | A1 | 7/2023 | Sviri et al. | |
| 2023/0247003 | A1* | 8/2023 | Chanak | H04L 9/3226 |
| | | | | 726/1 |
| 2023/0247016 | A1* | 8/2023 | Nagaraja | H04L 63/0807 |
| | | | | 726/8 |
| 2023/0336414 | A1* | 10/2023 | Miriyala | G06F 9/541 |
| 2023/0362236 | A1* | 11/2023 | Nair | H04L 67/1001 |
| 2024/0037242 | A1* | 2/2024 | Suryanarayana | G06F 21/31 |
| 2024/0095739 | A1* | 3/2024 | Adogla | G06Q 30/018 |
| 2024/0129161 | A1* | 4/2024 | Miriyala | H04L 41/122 |
| 2024/0129185 | A1* | 4/2024 | Shetye | H04L 67/10 |
| 2024/0129258 | A1* | 4/2024 | Ead | H04L 67/1031 |
| 2024/0129321 | A1* | 4/2024 | Howe | H04L 63/20 |
| 2024/0214350 | A1* | 6/2024 | Sole | H04L 63/0807 |
| 2024/0223454 | A1* | 7/2024 | Miriyala | H04L 63/20 |
| 2024/0297872 | A1* | 9/2024 | Stayskal | H04L 65/1069 |
| 2024/0346184 | A1* | 10/2024 | Suryanarayana | G06F 21/64 |
| 2024/0364509 | A1* | 10/2024 | Potlapally | H04L 63/107 |
| 2024/0364632 | A1* | 10/2024 | Henkel | H04L 45/04 |
| 2024/0378072 | A1* | 11/2024 | Ignoto | H04L 45/586 |
| 2024/0386098 | A1* | 11/2024 | Sawant | G06F 21/552 |
| 2024/0406277 | A1* | 12/2024 | Henkel | H04L 45/745 |
| 2025/0023787 | A1* | 1/2025 | Miriyala | H04L 63/0263 |
| 2025/0039131 | A1* | 1/2025 | Elul | H04L 63/30 |
| 2025/0039145 | A1* | 1/2025 | Dekel | H04L 63/0263 |
| 2025/0039152 | A1* | 1/2025 | Shwartz | H04L 63/08 |
| 2025/0039161 | A1* | 1/2025 | Gangadharappa | H04L 63/08 |
| 2025/0039173 | A1* | 1/2025 | Azrielant | H04L 63/0435 |
| 2025/0039195 | A1* | 1/2025 | Shwartz | H04L 63/0245 |
| 2025/0047605 | A1* | 2/2025 | Elul | H04L 63/0281 |
| 2025/0088360 | A1* | 3/2025 | Evani | H04L 9/3213 |
| 2025/0088544 | A1* | 3/2025 | Clark | H04L 63/205 |
| 2025/0112892 | A1* | 4/2025 | Parekh | H04L 63/0263 |
| 2025/0158989 | A1* | 5/2025 | Howe | H04L 63/20 |
| 2025/0158990 | A1* | 5/2025 | Howe | H04L 61/4511 |
| 2025/0159022 | A1* | 5/2025 | Howe | H04L 63/20 |
| 2025/0159023 | A1* | 5/2025 | Howe | H04L 63/10 |
| 2025/0202902 | A1* | 6/2025 | Long | G06F 21/604 |
| 2025/0233888 | A1* | 7/2025 | Bransi | | |
| 2025/0279950 | A1* | 9/2025 | Swindle | H04L 41/0893 |
| 2025/0286888 | A1* | 9/2025 | Small | H04L 63/0815 |

OTHER PUBLICATIONS

Wikipedia, "iptables", available online at <https://en.wikipedia.org/w/index.php?title=Iptables&oldid=1093246628>, Jun. 15, 2022, 3 Pages.

Wikipedia, "Windows Filtering Platform", available online at <https://en.wikipedia.org/w/index.php? title=Windows_Filtering_Platform&oldid=1009001725>, Feb. 26, 2021, 2 pages.

Wikipedia, "Secure Shell", available online at <https://en.wikipedia.org/w/index.php? title=Secure_Shell&oldid=1158549718>, Jun. 4, 2023, 8 pages.

* cited by examiner

REMOTE SERVER ISOLATION UTILIZING ZERO TRUST ARCHITECTURE

TECHNICAL FIELD

The present disclosure relates generally to providing secure network applications and specifically to providing secure network applications utilizing a zero trust cloud architecture.

BACKGROUND

Organizations typically have networks of computers and servers which are interconnected in one or more physical premises. As networks and the internet have evolved, many organizations find benefit in having their employees work remotely, whether in their own homes, or at a client location, thus providing the organization's clients with a more personal touch. This evolution has allowed employees to access their organization's network across the internet from locations outside of the organization's control.

Naturally, this opportunity also presents a severe risk, as the organization has no control over the other networks or other individuals, such as attackers, which may be connected to the same remote networks as their employees.

The Secure Shell (SSH) protocol is an example of a cryptographically secured network protocol which allows operating network services over an unsecured network. SSH provides a secure channel, for example over the internet, by establishing a client-server relation between two machines-one being the SSH client and the other the SSH server.

One challenge of providing SSH access for example, is that once a user establishes a client connection to a server on a secure network, the user may be able to access other machines on the secure network, perform privilege escalation, lateral movement attacks, or otherwise access network portions which they are not authorized to.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include receiving a request to authenticate an identity from a client device, the identity including at least an unique identifier of an user. Method may also include receiving a request to access a CSNA on a remote server through the zero trust cloud environment, the remote server deployed in a secure network environment, having a default network namespace (DNN), where the request includes session credentials for logging in to the CSNA, and where the secure network environment is communicatively coupled with the zero trust cloud environment. Method may furthermore include piping communication between the client device and the remote server through the zero trust cloud environment. Other embodiments of this aspect include corresponding computer systems, apparatus, and computer programs recorded on one or more computer storage devices, each configured to perform the actions of the methods.

Implementations may include one or more of the following features. Method may include: configuring the remote server to: generate an isolated network namespace (INN); generate a bridge between the INN and the DNN; assign a name from the INN to a virtual network interface (VNI); and generate a new CSNA in the INN. Method may include: configuring a default network namespace (DNN) firewall of the remote server to drop data packets from the INN directed to the secure network environment. Method may include: configuring the DNN firewall to forward data packets from the INN which are not directed to the secure network environment. Method may include: accessing a policy engine to determine a policy matching: the identity, the session credentials, and a combination thereof. Method may include: piping the communication based on the determined policy. Method where the CSNA is an SSH session. Method where the zero trust cloud environment includes any one of: a frontend CSNA server, an access portal server, a backend server, and any combination thereof. Method where the backend server is configured to connect to a connector deployed in the secure network environment. Method where the client device is configured to communicate with the frontend CSNA server. Implementations of the described techniques may include hardware, a method or process, or a computer tangible medium.

In one general aspect, non-transitory computer-readable medium may include one or more instructions that, when executed by one or more processors of a device, cause the device to: receive a request to authenticate an identity from a client device, the identity including at least an unique identifier of an user. Medium may furthermore receive a request to access a CSNA on a remote server through the zero trust cloud environment, the remote server deployed in a secure network environment, having a default network namespace (DNN), where the request includes session credentials for logging in to the CSNA, and where the secure network environment is communicatively coupled with the zero trust cloud environment. Medium may in addition pipe communication between the client device and the remote server through the zero trust cloud environment. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: receive a request to authenticate an identity from a client device, the identity including at least an unique identifier of an user. System may in addition receive a request to access a CSNA on a remote server through the zero trust cloud environment, the remote server deployed in a secure network environment, having a default network namespace (DNN), where the request includes session credentials for logging in to the CSNA, and where the secure network environment is communicatively coupled with the zero trust cloud environment. System may moreover pipe communication between the client device and the remote server through the zero trust cloud environment. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: configure the remote server to: generate an isolated network namespace (INN); generate a bridge between the INN and the DNN; assign a name from the INN to a virtual network interface (VNI); and generate a new CSNA in the INN. System where the memory contains further instructions which when executed by the processing circuitry further configure the system to: configure a default network namespace (DNN) firewall of the remote server to drop data packets from the INN directed to the secure network environment. System where the memory contains further instructions which when executed by the processing circuitry further configure the system to: configure the DNN firewall to forward data packets from the INN which are not directed to the secure network environment. System where the memory contains further instructions which when executed by the processing circuitry further configure the system to: access a policy engine to determine a policy matching: the identity, the session credentials, and a combination thereof. System where the memory contains further instructions which when executed by the processing circuitry further configure the system to: pipe the communication based on the determined policy. System where the CSNA is an SSH session. System where the zero trust cloud environment includes any one of: a frontend CSNA server, an access portal server, a backend server, and any combination thereof. System where the backend server is configured to connect to a connector deployed in the secure network environment. System where the client device is configured to communicate with the frontend CSNA server. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
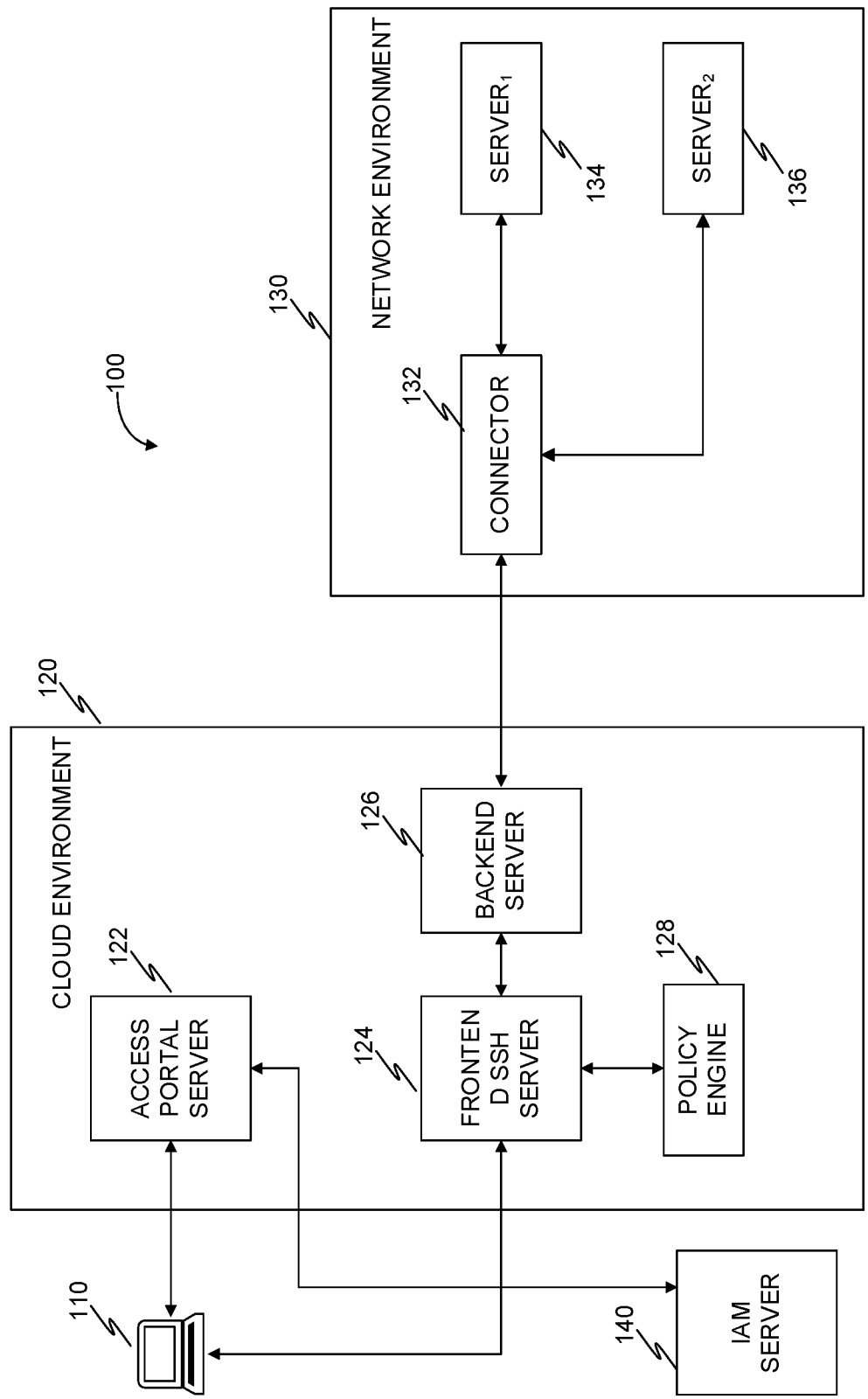
FIG. 1 is an example of a network diagram of a zero trust network architecture for providing a cryptographically secure application service, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing a cryptographically secure network session to a server through a zero trust network. In an embodiment, it is advantageous to further isolate the server, so that access is provided to that server only, and access from the server to other portions of the network are not possible for that session.

For example, in an embodiment, a server provide secure shell (SSH) communication to access the server. It is advantageous to be able to access the server via SSH within the secure network in which the SSH server is deployed. According to an embodiment, the SSH server is configured to access other resources, such as servers, devices, applications, virtual machines, software containers, serverless functions, combinations thereof, and the like. In an embodiment, it is desirable to provide access only to the SSH server through a zero trust network, such that once the server is accessed through the zero trust network, it is not possible to access other elements of the secure network through the SSH server.

In an embodiment, this provides an added layer of cybersecurity, while allowing different access when the SSH server is accessed from within the secure network.

FIG. 1 is an example of a network diagram of a zero trust network architecture 100 for providing a cryptographically secure application service, implemented in accordance with an embodiment. This disclosure deals primarily with providing an SSH service in a zero trust network architecture as an example of a cryptographic network protocol for providing network services. It is understood that other protocols may utilize the teachings herein to provide secure network services in a similar manner.

A client device 110 is operative for communicating over a network (not shown) with an access portal server 122, and a frontend SSH server 124, implemented in a first cloud environment 120. The client device 110 may be a personal computer, smart phone, tablet, and the like. The client device 110 may include an SSH client application.

The first cloud environment is a computing environment for providing services utilizing a zero trust architecture. The first cloud environment may be implemented on one or more cloud infrastructure technologies, such as Microsoft® Azure, Google® Cloud Platform (GCP), Amazon® Web Services (AWS) and the like. The elements of the first cloud environment 120 may be implemented, for example, as virtual workloads, such as containers and virtual machines. In certain embodiments, the access portal server 122 and frontend SSH server 124 may be implemented as a single workload. An implementation of the frontend SSH server 124 is discussed in more detail with respect to FIG. 5 below.

The client device 110 sends a request to authenticate to the access portal 122. In an embodiment the access portal server 122 may utilize an identity access management (IAM) service, for example from IAM server 140, in order to verify the user account which is requesting access via the client device 110. In an embodiment the IAM server 140 may be implemented in the first cloud environment 120. The client device 110 may provide the access portal server 122 (or IAM server 140) with login credentials, such as username and password. IAM services may be provided, for example by solutions such as Okta®, Auth0®, OneLogin®, and the like.

After verifying the identity of the user account, the access portal server 122 may provide the frontend SSH server 124 with an instruction that the user account is verified. Such an instruction may be, for example, sending a token to the client device 110 with which to encrypt future communication, and indicating to the frontend SSH server 124 that the token is a valid token.

Once a user account is verified, the user device 110 may send a request to the frontend SSH server 124 to initiate an SSH session with a remote server. In an embodiment, the access portal server 122 may provide a graphical user interface (GUI) through which a user of the user device may provide a request to access the SSH session. In some embodiments, the user may select an SSH session to a server, out of a plurality of servers. The SSH servers are deployed in a secure network environment 130. For example, a first SSH server 134 and second SSH server 136 (referred to together as the SSH servers) are deployed in a secure network environment 130. The SSH servers are communicatively connected to a backend server 126 through a connector, such as connector 132, through which the SSH servers communicate with the frontend SSH server 124. A connector is deployed in a secure network environment and communicates with the backend server 126 of the zero trust cloud environment 120 to send and receive network traffic. In an embodiment one or more backend servers may each communicate with one or more connectors, each connector deployed in a secure network environment.

In an embodiment the backend server 126 may be deployed in the communication between the frontend SSH server 124 and the connector 132. The backend server 126 may communicate with the connector 132, which is implemented in the secure network environment 130.

Once an SSH channel is established, there is a risk of lateral movement in the secure network environment 130, privilege escalation, or other possible network based attacks. One aim of this disclosure is to provide an isolated SSH session, such that a user account cannot access resources in the secure network environment 130, unless they are specifically allowed in a policy defined by the policy engine 128.

Figure 2:
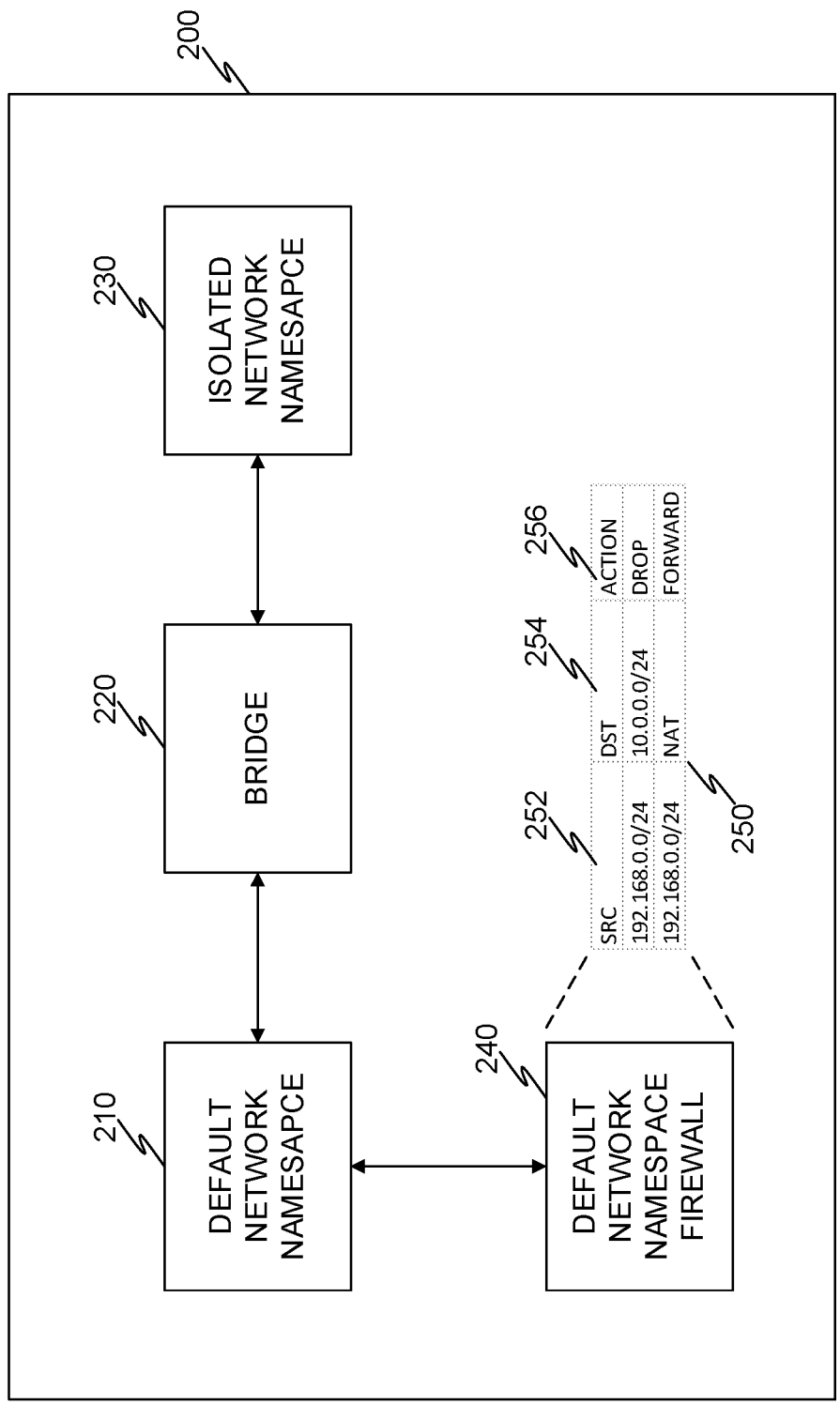
FIG. 2 is an example of a schematic illustration of an SSH server providing an isolated environment, implemented in accordance with an embodiment.

FIG. 2 is an example of a schematic illustration of an SSH server 200 providing an isolated environment, implemented in accordance with an embodiment. The first SSH server 134, second SSH server 136 of FIG. 1, or both, may be configured by the zero trust cloud platform as the SSH server 200 of FIG. 2. The SSH server 200 includes a default network namespace 210, in which the SSH server 200 is assigned a unique name (e.g., IP address). The SSH server 200 is deployed in a secure network environment, such as the secure network environment 130 of FIG. 1. Additional workloads, such as physical machines, virtual machines, containers, serverless functions, and the like, may also be deployed in the secure network environment, and may be accessible to the SSH server 200 through the default namespace 210.

A frontend SSH server, communicatively coupled with the SSH server 200, initiates an SSH session by logging in to the SSH server 200 using root (or admin, superuser, etc.) permissions. The frontend SSH server then configures the SSH server 200 to generate an isolated network namespace 230, which includes therein network interfaces which do not appear in the default network namespace 210. For example, the default network namespace 210 may include network interfaces assigned with IP addresses 192.168.0.0 to 192.168.0.63, while the isolated network namespace 230 includes virtual network interfaces assigned with IP addresses 10.0.0.0 through 10.0.0.127. The size of each namespace (i.e. the number of unique names therein) may be different between the default network namespace 210 and the isolated network namespace 230, according to an embodiment. The frontend SSH server configures the SSH server 200 to generate a virtual network interface for the isolated network namespace 230.

The frontend SSH server further configures the SSH server 200 to generate a bridge 220 connecting a network interface of the default network namespace 210 to a virtual network interface of the isolated network namespace 230. The default network namespace further includes a firewall 240 unique to the default network namespace, such as iptables in Linux® or Windows® Filtering Platform (WFP). The DNN firewall 240 allows to configure IP packet filter rules, which may be stored as a table, such as rule table 250. The rule table 250 includes a plurality of rules, each represented by a row in the rule table 250. In an embodiment, each row includes a source 252, destination 254, and action 256. Thus, a rule may be configured to allow (i.e. forward) IP packets having a network address translator (NAT) address to pass through, while another rule is for dropping packets which are directed at IP addresses of the default network namespace 210. In certain embodiments a rule may be generated to allow any IP packet which is not directed to the default network, to pass.

Utilizing this configuration, a user logged in to a shell deployed in the implemented isolated network namespace is unable to access addresses outside of the isolated environment, while still being able to fully access the SSH server 200.

Figure 3:
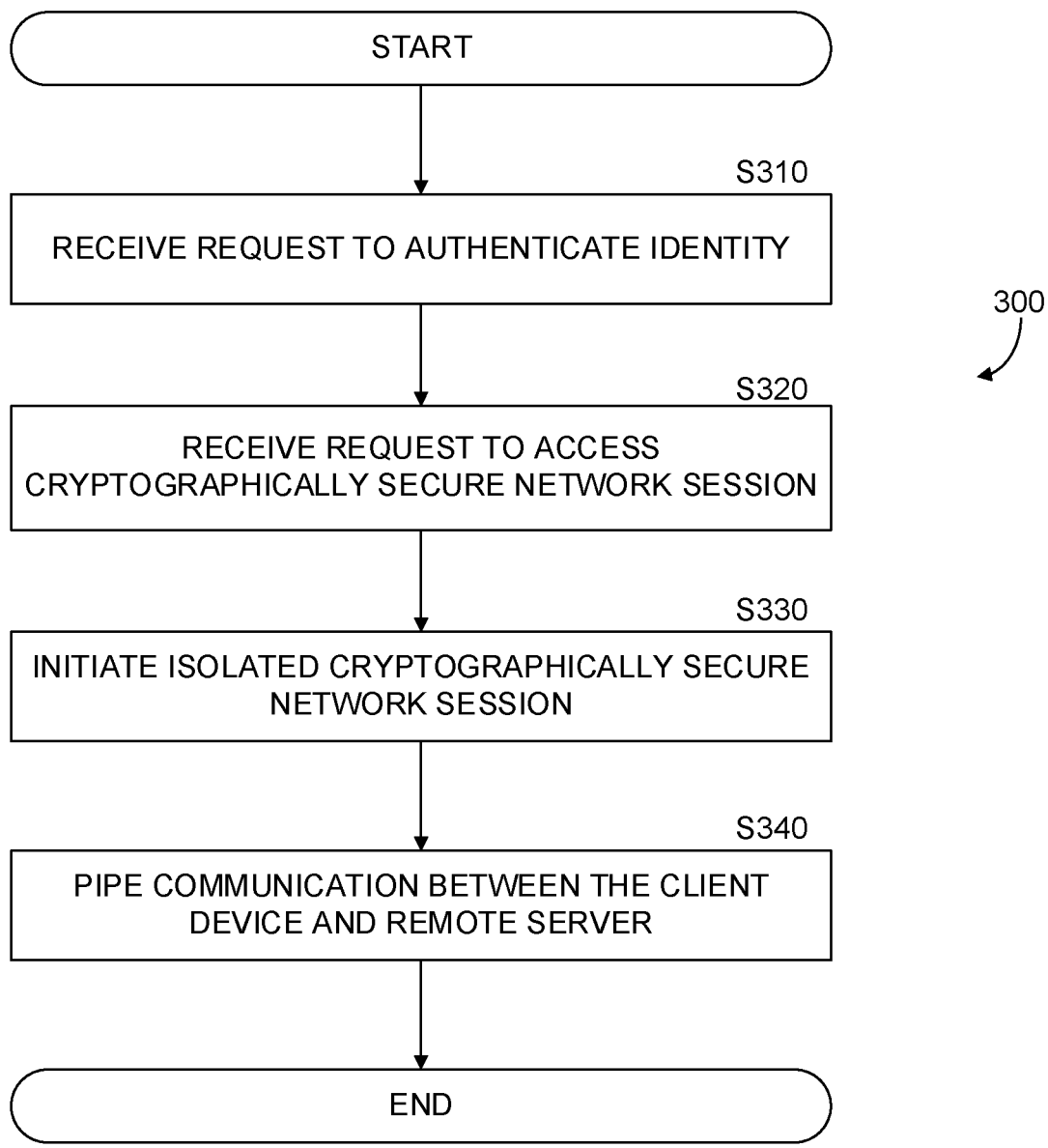
FIG. 3 is a flowchart of a method for initiating a cryptographically secure network session utilizing a zero trust cloud environment, implemented in accordance with an embodiment.

FIG. 3 is a flowchart 300 of a method for initiating a cryptographically secure network session utilizing a zero trust cloud environment, implemented in accordance with an embodiment.

At S310, a request is received to authenticate an identity. The identity may be of a user account, and the request originates from a user device. In an embodiment, an identity verification service may be used, for example supplied by an Identity and Access Management (IAM) Server. A user account identity may include a username, email, password, and the like identifiers. In an embodiment, if the identity is not authenticated (e.g. no username exists, wrong password, etc.) the client device may be provided with an error notification, indicating that authentication was unsuccessful. In an embodiment, identity authentication is performed between the client device and an access portal server.

In an embodiment, authenticating the identity may further include querying a policy engine to determine a security policy which is applied to the user account associated with the identity. A policy engine includes rules, which in an embodiment may be expressed as text, indicating what a user account is authorized to do, what a user account is not authorized to do, what workloads the user account is allowed to access, what workloads the user account is not allowed to access, or any combination thereof. A policy in the policy engine may further be used to determine a length of time during which the user account may access certain resources (i.e. workloads).

At S320 a request is received to initiate a cryptographically secure network application. In this example, the network session is an SSH session, where the client device is the SSH client. The request may include an identifier to designate a specific SSH server. The SSH server is in a secure network environment, which the client device is attempting to access.

In an embodiment, an access portal server may generate a GUI through which a client device may instruct the access portal on which SSH server the client device wishes to initiate an SSH session with. For example, the access portal server GUI may include a first icon representing a first SSH server, a second icon representing a second SSH server, etc. By clicking on the first icon or the second icon, an instruction is generated to initiate an SSH session with the first SSH server or the second SSH server, respectively.

In certain embodiments, session credentials may be required in order to initiate the cryptographically secure network session. Session credentials may be unique to a secure network or to a workload (e.g. the SSH server) of the secure network. For example, an email address and corresponding password may be used to authenticate the user identity at S310, while a username and corresponding password may be used to log in to the SSH session requested at S320.

At S330, an isolated cryptographically secure network session is initiated. For example, a frontend SSH server which is communicatively coupled with an access portal server receives a request from the access portal to initiate an SSH session for the client device. The frontend SSH server may receive the session credentials from the access portal server, in certain embodiments. The frontend SSH server may utilize the received session credentials to verify the session credentials with the SSH server, prior to initiating the SSH session for the client device. Initiating cryptographically secure network sessions is discussed in more detail with respect to FIG. 4 below.

At S340, a cryptographically secure network session is piped between the client device and the SSH server. In an embodiment, piping the session is performed by the frontend SSH server. The frontend SSH server configures an isolated session, which may be generated for example based on a policy received from the policy engine.

Figure 4:
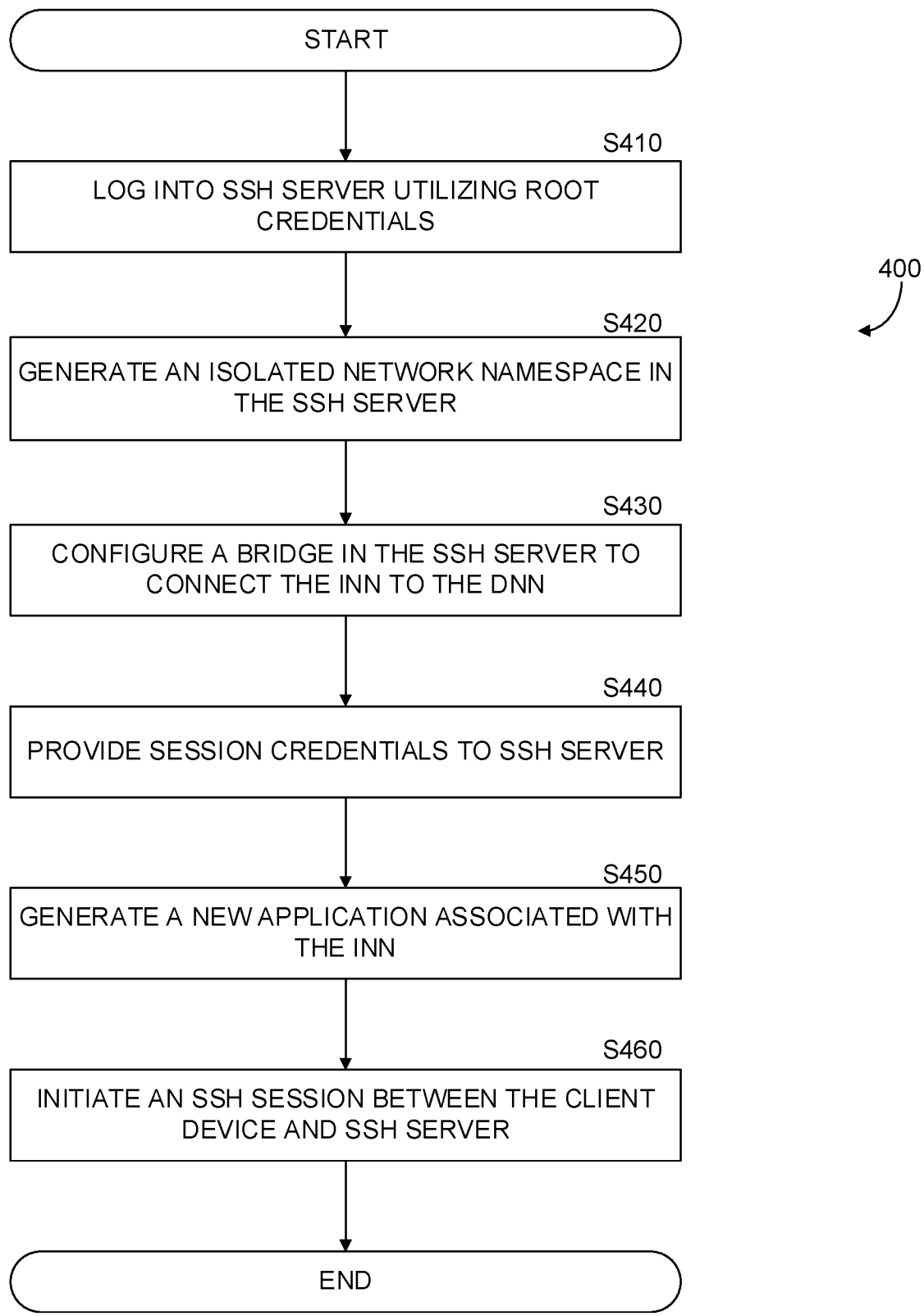
FIG. 4 is an example of a flowchart of a method for initiating an isolated cryptographically secure network session, implemented in accordance with an embodiment.

FIG. 4 is an example of a flowchart 400 of a method for initiating an isolated cryptographically secure network session, implemented in accordance with an embodiment. This example embodiment continues the use of the SSH session example of FIG. 3 above.

At S410, root credentials are used to log into an SSH server. In an embodiment, the frontend SSH server may use a root (or admin) user to log into the SSH server in the secure network environment. A root user has the highest level of authorization to operate on a machine, thus allowing the frontend SSH server to configure the SSH server for example to generate the isolated network namespace.

At S420, the zero trust cloud environment configures an isolated network namespace within the SSH server. The SSH server is deployed in a secure network environment, having a default network namespace. A network namespace may include, for example, network interfaces which have IP addresses assigned thereto which are used by various workloads and components connected to the secure network to communicate with each other. The isolated network namespace is a namespace which does not share any names with the default network namespace. The isolated network namespace may further include a virtual network interface (VNI). A name from the isolated network namespace is assigned to the VNI. In an embodiment an IP address is assigned to the VNI. By assigning an IP address to the VNI, the VNI is accessible through the bridge. In an embodiment, the VNI may be turned on, if the default setting for a new VNI is off. Turning on a VNI may include enabling the interface, thus allowing it to receive and send IP packets. For example, the frontend SSH server may perform an SSH connection utilizing the root credentials and preconfigure the SSH server for a user SSH session.

At S430, the zero trust cloud environment configures a bridge in the SSH server, connecting the default network namespace to the isolated network namespace. The bridge routes IP packets between the VNI of the isolated network namespace and a network interface of the default network namespace, to allow traffic flow in both directions. Configuring the SSH server to generate a bridge may be performed by the frontend SSH server utilizing a root user to instruct the SSH server to generate the bridge, for example by providing instructions over the secure shell.

At S440, session credentials are provided to the SSH server. Session credentials may be captured by the frontend SSH server, the access portal server, or both. The session credentials are used to log into the new application, which is in the isolated network namespace. Thus, a user utilizing the session credentials is ultimately directed to an SSH session via the command line application which is isolated from the rest of the secure network. Traffic to the default network is dropped, while other traffic is forwarded, for example to a NAT, as usual. The SSH frontend server pipes the session between the client device and the SSH server, allowing for an additional layer of control.

At S450, an SSH server is instructed to generate a new application associated with the isolated network namespace in response to receiving a request from a zero trust cloud environment. In an embodiment, the new application is a command line application, deployed on the SSH server. The SSH server may be configured to generate the new application by a frontend SSH server of the zero trust cloud environment utilizing a root user. In an embodiment, IP-based routing rules may be generated in a default network namespace firewall, which indicate how to route IP packets received and sent by components assigned a name from the isolated network namespace. For example, iptables may have rules generated based on a policy extracted from a policy engine by the frontend SSH server. The new application may be a user SSH session.

At S460, the zero trust cloud environment initiates an SSH session between the client device and the SSH server. In an embodiment the SSH session is piped between the client device and the SSH server by the frontend SSH server. The frontend SSH server configures an isolated session, which may be generated for example based on a policy received from the policy engine.

In an embodiment, the user may be logged out of the SSH session after a predetermined period of time. In another embodiment, the user may log out of the SSH session. Upon logging out of the SSH session, the isolated application (SSH terminal) is closed, but the isolated namespace, bridge, and routing rules remain in place. Thus, the next time a user logs in utilizing the same SSH server and credentials, the infrastructure is already in place to initiate the isolated SSH session.

Figure 5:
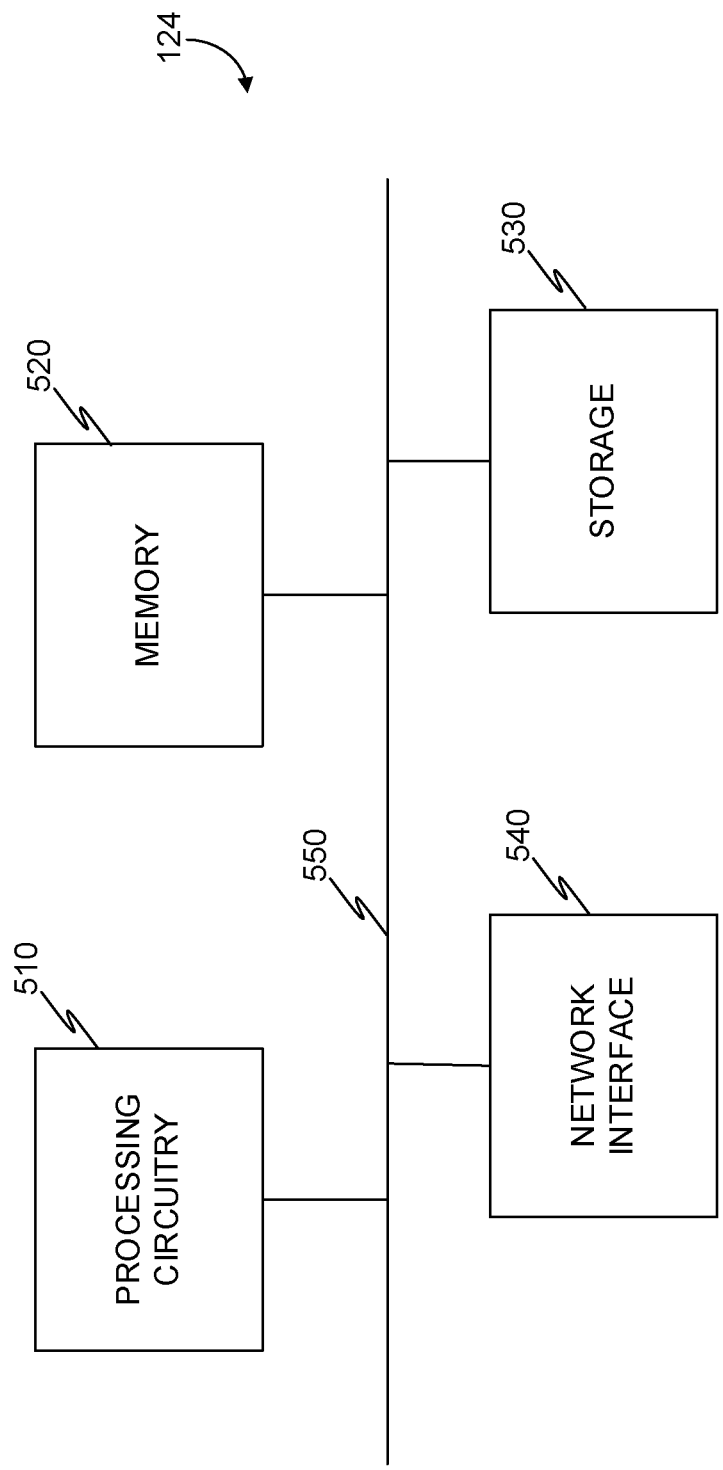
FIG. 5 is an example schematic diagram of a frontend SSH server, implemented according to an embodiment.

FIG. 5 is an example schematic diagram of a frontend SSH server 124, implemented according to an embodiment. The frontend SSH server 124 includes a processing circuitry 510 coupled to a memory 520, a storage 530, and a network interface 540. In an embodiment, the components of the frontend SSH server 124 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, solid state storage, and the like, and may be realized, for example, as flash memory or other memory technology, or any other medium which can be used to store the desired information.

The network interface 540 allows the frontend SSH server 124 to communicate with, for example, client device 110, the access portal server 122, the policy engine 128, SSH server 200, connector 123, or any combination thereof.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
   receiving a request to authenticate an identity from a client device, the identity including at least a unique identifier of a user;
   receiving a request to access a cryptographically secure network application (CSNA) on a remote server through the zero trust cloud environment, the remote server deployed in a secure network environment, and having a default network namespace (DNN), wherein the request includes session credentials for logging in to the CSNA, and wherein the secure network environment is communicatively coupled with the zero trust cloud environment;
   piping communication between the client device and the remote server through the zero trust cloud environment; and
   configuring the remote server to:
      generate an isolated network namespace (INN);
      generate a bridge between the INN and the DNN;
      assign a name from the INN to a virtual network interface (VNI); and
      generate a new CSNA in the INN.

2. The method of claim 1, further comprising: configuring a DNN firewall of the remote server to drop data packets from the INN directed to the secure network environment.

3. The method of claim 2, further comprising: configuring the DNN firewall to forward data packets from the INN which are not directed to the secure network environment.

4. The method of claim 1, further comprising:
accessing a policy engine to determine a policy matching: the identity, the session credentials, and a combination thereof.

5. The method of claim 4, further comprising:
piping the communication based on the determined policy.

6. The method of claim 1, wherein the CSNA is an SSH session.

7. The method of claim 1, wherein the zero trust cloud environment includes any one of: a frontend CSNA server, an access portal server, a backend server, and any combination thereof.

8. The method of claim 7, wherein the backend server is configured to connect to a connector deployed in the secure network environment.

9. The method of claim 7, wherein the client device is configured to communicate with the frontend CSNA server.

10. A non-transitory computer-readable medium comprising instructions executable by at least one processor to:
receive a request to authenticate an identity from a client device, the identity including at least a unique identifier of a user;
receive a request to access a cryptographically secure network application (CSNA) on a remote server through the zero trust cloud environment, the remote server deployed in a secure network environment, having a default network namespace (DNN), wherein the request includes session credentials for logging in to the CSNA, and wherein the secure network environment is communicatively coupled with the zero trust cloud environment;
pipe communication between the client device and the remote server through the zero trust cloud environment; and
configure the remote server to:
generate an isolated network namespace (INN);
generate a bridge between the INN and the DNN;
assign a name from the INN to a virtual network interface (VNI); and
generate a new CSNA in the INN.

11. A system comprising:
a processing circuitry; and
a non-transitory computer-readable medium comprising instructions executable by the processing circuitry; to:
receive a request to authenticate an identity from a client device, the identity including at least a unique identifier of a user;
receive a request to access a cryptographically secure network application (CSNA) on a remote server through the zero trust cloud environment, the remote server deployed in a secure network environment, having a default network namespace (DNN), wherein the request includes session credentials for logging in to the CSNA, and wherein the secure network environment is communicatively coupled with the zero trust cloud environment;
pipe communication between the client device and the remote server through the zero trust cloud environment; and
configure the remote server to:
generate an isolated network namespace (INN);
generate a bridge between the INN and the DNN;
assign a name from the INN to a virtual network interface (VNI); and
generate a new CSNA in the INN.

12. The system of claim 11, wherein the memory contains further instructions which when executed by the processing circuitry further configure the system to:
configure a DNN firewall of the remote server to drop data packets from the INN directed to the secure network environment.

13. The system of claim 12, wherein the memory contains further instructions which when executed by the processing circuitry further configure the system to:
configure the DNN firewall to forward data packets from the INN which are not directed to the secure network environment.

14. The system of claim 11, wherein the memory contains further instructions which when executed by the processing circuitry further configure the system to:
access a policy engine to determine a policy matching: the identity, the session credentials, and a combination thereof.

15. The system of claim 14, wherein the memory contains further instructions which when executed by the processing circuitry further configure the system to:
pipe the communication based on the determined policy.

16. The system of claim 11, wherein the CSNA is an SSH session.

17. The system of claim 11, wherein the zero trust cloud environment includes any one of: a frontend CSNA server, an access portal server, a backend server, and any combination thereof.

18. The system of claim 17, wherein the backend server is configured to connect to a connector deployed in the secure network environment.

19. The system of claim 17, wherein the client device is configured to communicate with the frontend CSNA server.

* * * * *